United States Patent [19]

Edwards et al.

[11] Patent Number: 4,920,308
[45] Date of Patent: Apr. 24, 1990

[54] REGULATOR FOR AUTOMOTIVE CHARGING SYSTEMS

[75] Inventors: Arthur J. Edwards, Hoffman Estates, Ill.; Randall C. Gray, Tempe, Ariz.

[73] Assignee: Motorola, Inc., Schaumburg, Ill.

[21] Appl. No.: 332,125

[22] Filed: Apr. 3, 1989

[51] Int. Cl.[5] .......................... H02J 7/14; H02K 11/00
[52] U.S. Cl. .................................... 322/58; 322/28; 322/73
[58] Field of Search ............................ 322/28, 58, 73

[56] References Cited
U.S. PATENT DOCUMENTS

| | | | |
|---|---|---|---|
| 3,560,840 | 2/1971 | Stalp | 322/58 X |
| 3,593,113 | 7/1971 | Wiley | 322/58 X |
| 4,340,849 | 7/1982 | Kuhn | 322/58 X |
| 4,636,705 | 1/1987 | Bowman | 322/28 |

*Primary Examiner*—R. J. Hickey
*Attorney, Agent, or Firm*—John H. Moore

[57] ABSTRACT

A regulator for a vehicle charging system senses when it applies and terminates excitation to the field winding of the charging system's alternator. When the excitation is applied to the field windings, the output of the alternator is connected to an input filter in the regulator so that the regulator can sense the alternator's output. When the excitation is terminated, the input filter is disconnected from the alternator's output to isolate the filter from voltage steps induced in the alternator's output by the turn-on and turn-off of the field excitation.

5 Claims, 3 Drawing Sheets

REGULATOR FOR AUTOMOTIVE CHARGING SYSTEMS

FIELD OF THE INVENTION

This invention is directed to the field of electronic regulators for automotive charging systems.

BACKGROUND OF THE INVENTION

The typical electronic regulator modifies the excitation applied to an alternator's field winding so as to hold the alternator's output voltage close to a desired mean value. This is usually achieved by periodically pulse-width-modulating the excitation voltage applied to the field winding so that the "on" time of the excitation voltage varies over a given regulation cycle (each regulation cycle may typically last for about 20 milliseconds). Where a larger alternator output voltage is called for, the "on" time of the excitation voltage is increased.

As described in more detail below, switching the excitation voltage off and on causes relatively large and undesired voltage steps to appear in the output of the alternator that is sensed by the regulator. These steps, plus other undesired transient voltages, are conveniently applied to a filter (typically, an R-C filter) prior to being processed by the regulator. If the filter is not able to quickly recover from the switching-induced voltage steps. improper regulation can occur. One undesirable result of such improper regulation is an apparent reduction of the regulation frequency from 50 Hz (typically) to 25 Hz. This change in frequency can manifest itself in visible headlight flicker, an obviously objectionable result.

As mentioned above, the cause of this problem is the inability of the regulator's filter to quickly recover from the switching-induced voltage steps. This recovery should occur during the regulator's minimum "on" time (a minimum interval when excitation is always being applied to the alternator's field winding) which may be as small as 1 millisecond. Thus, a filter with a fast time constant is called for. On the other hand, the filter's time constant needs to be relatively large to effect good regulation under all operating conditions. These conflicting requirements can give rise to compromises in the designs of the filter, and thus result in less than satisfactory regulation under all conditions.

OBJECTS OF THE INVENTION

It is a general object of the invention to provide an improved regulator which overcomes the above-described problems.

It is a more specific object of the invention to provide a regulator which provides good regulation under all conditions, and which specifically handles the above-described voltage steps without any apparent reduction in the frequency of regulation.

DESCRIPTION OF THE PREFERRED EMBODIMENT

Figure 1:
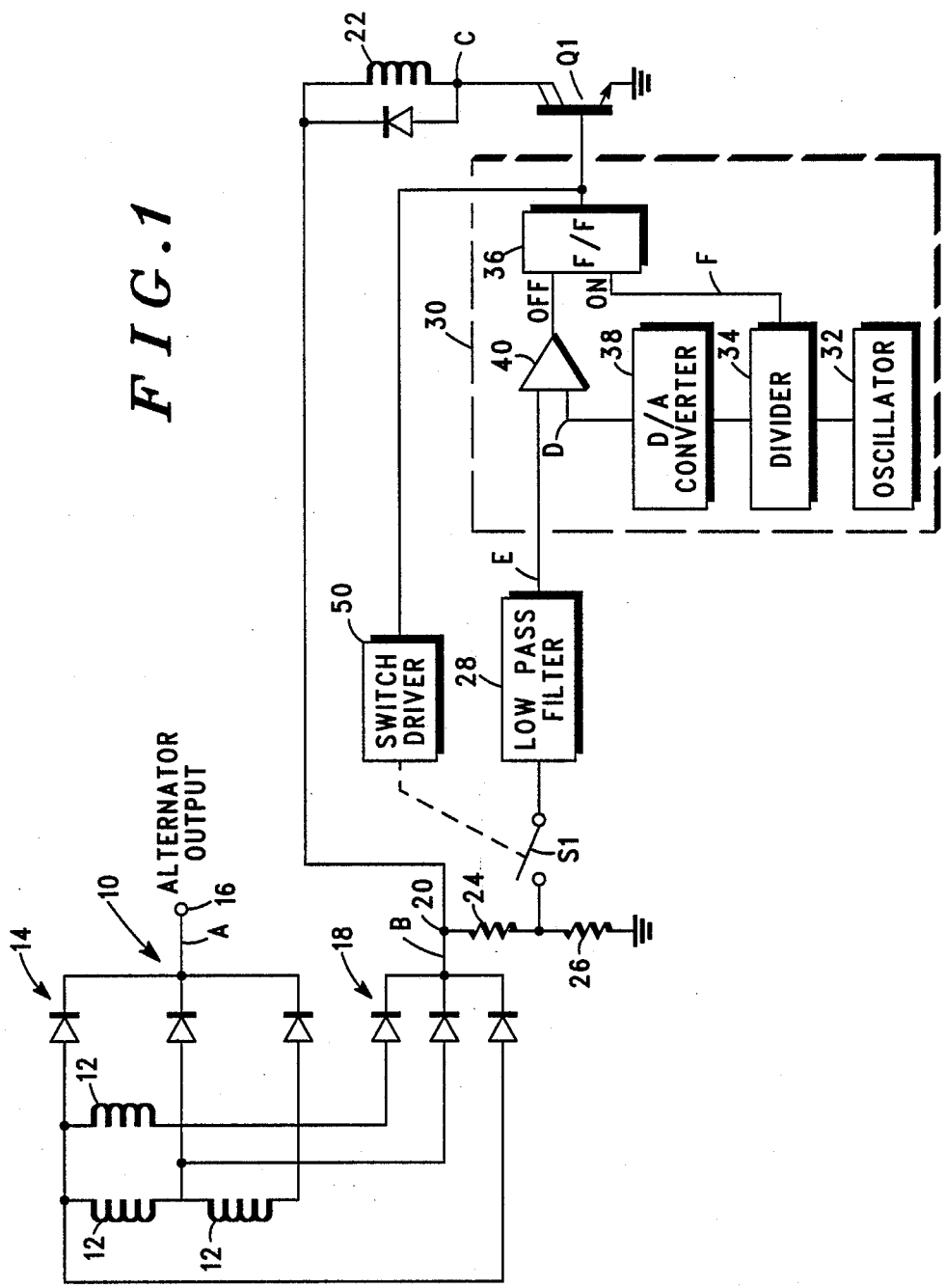
FIG. 1 is a schematic diagram of a regulator that has been modified per this invention and the relevant portions of an alternator whose output is controlled by the regulator.

Referring now to FIG. 1, a portion of an alternator 10 is shown which includes three conventional stator windings 12 interconnected in the conventional manner to develop an electrical output when the alternator's rotor is rotated. The outputs from these three windings are coupled through diodes 14 to an alternator output terminal 16 which is typically coupled to a battery (not shown) in an automotive vehicle.

The output of the alternator's stator windings is sensed by coupling those windings through a so-called diode trio 18 to another output terminal 20 which acts as an input to an electronic voltage regulator. The amplitude of the alternator's voltage at the terminal 20 is compared to a reference voltage within the regulator and, depending on the relative amplitude of the alternator's voltage at terminal 20, a drive transistor Q1 will be selectively turned on and turned off in order to provide excitation to the alternator's field winding 22.

To control the conduction of the transistor Q1, the output signal from the diode trio 18 is coupled via a voltage divider comprising resistors 24 and 26 to the input of a filter 28 which is preferably a low pass filter (the switch S1 between the voltage divider and the low pass filter will be discussed later).

The output signal from the filter 28 is coupled to the input of a processing circuit 30 whose basic function is to sense the output signal from the filter, compare it to an internally generated reference signal, and terminate the excitation of the field winding 22 when the filter's output signal is greater than a predetermined level; the processing circuit 30 turns on the excitation for the field winding 22 for at least a minimum "on" time during each cycle of regulation.

In the illustrated embodiment, the processing circuit 30 includes an oscillator 32 which operates at a fixed frequency, a divider 34 which divides down the oscillator signal by a convenient scaling factor to generate an output signal of 50 Hz for example. One output from the divider 34 is coupled to the "on" input of a flip-flop 36 while another output therefrom is coupled to a digital-to-analog converter 38. The output of the converter 38 is a periodic ramp signal which is coupled to one input of a comparator 40. The other input to the comparator 40 is received from the output of the filter 28. The output of the comparator 40 is, in turn, coupled to the "off" input of the flip-flop 36, the latter device having an output which is used to turn the transistor Q1 off and on, thereby turning off and on the excitation to the field winding 22. (Also coupled to the output of the flip-flop 36 is a switch driver whose operation will be described later in connection with the operation of the switch S1).

The operation of the charging system will now be described in more detail in order to illustrate the problems which the present invention overcomes.

Figure 2:
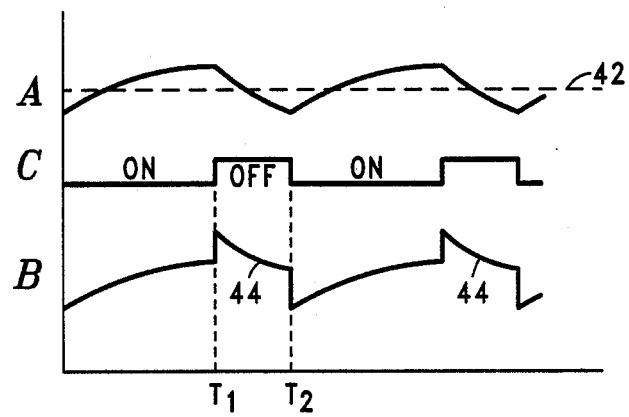
FIGS. 2, 3 and 4 show various waveforms that are useful in describing the operation of the circuitry shown in FIG. 1.

Referring to FIG. 2, waveform A illustrates the alternator output voltage that is generated on lead A (terminal 16) in FIG. 1. Likewise, waveform B illustrates the voltage output from the diode trio 18 a it appears on lead B (at terminal 20), and waveform C of FIG. 2 illustrates the excitation voltage that is present at terminal C (at the collector of Q1) in FIG. 1. Basically, and as mentioned previously, the transistor Q1 is selectively turned off and on to modulate the excitation applied to the field winding 22 in order to maintain the alternator output (waveform A) at a desired mean level indicated by the dashed line 42 in FIG. 2. The waveform B differs from waveform A in that the former includes voltage spikes or steps 44 that are induced in the voltage at the output of the diode trio 18 due to the switching off and on of the excitation applied to the field coil 22 and the resultant voltage drop across the three diodes in the diode trio 18. For example, when the field excitation is turned off at time T1 in FIG. 2, the resultant decrease in current flowing through the diode trio 18 to the field winding 22 causes the voltage at terminal 20 to increase abruptly as shown. That voltage declines gradually (as shown by waveform B) until time T2 when the field excitation is turned on, thereby causing a sharp increase of current through the diode trio and causing the voltage at terminal 20 to decrease abruptly. Similar voltage steps are induced in the voltage output from the diode trio during each cycle of regulation, and it is these voltage steps which, as will now be described, give rise to the problems associated with conventional regulators.

Figure 3:
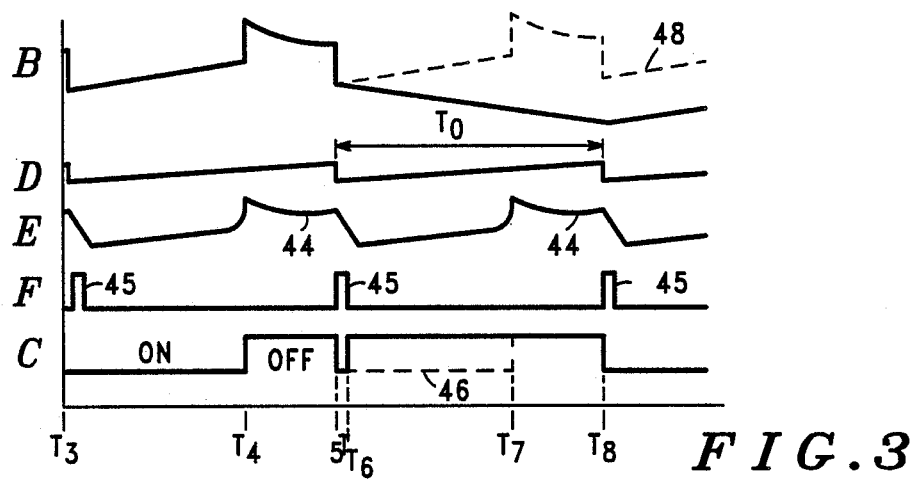

Referring now to FIG. 3 and also to FIG. 1, the convertor 38 generates a reference ramp output which is illustrated as waveform D in FIG. 3. One such ramp is generated for each cycle of regulation, and T0 indicates the period associated with one such cycle.

The waveform D is applied as one input to the comparator 40. The other input to the comparator 40, taken from the output of lowpass filter 28, is shown as waveform E. When the amplitude of waveform E exceeds the amplitude of the reference waveform D, the output of the comparator 40 goes high to turn off the flip-flop 36. Otherwise, the flip-flop 36 remains on and its output remains high to actuate the transistor Q1 to excite the field winding 22.

The output of the divider 34 is illustrated as waveform F in FIG. 3. As shown, waveform F comprises small periodic pulses 45 which occur once during each cycle of regulation. Typically, the pulses 45 are generated at a 50 Hz rate and the duration of each pulse is held constant at about 1 ms. Consequently, the flip-flop is forced on by a pulse 45 for a minimum "on" time of 1 ms. during each cycle of regulation, irrespective of the output of the comparator 40.

With reference again to FIG. 3, a cycle of operation will be described beginning at the time shown as T3 (in FIG. 3 the waveforms B through F correspond to voltages at the correspondingly labeled points in FIG. 1). At time T3, the divider 34 is in the process of outputting a pulse 45, thus causing the field excitation to be "on" as shown by waveform C. Immediately after the conclusion of the first pulse 45 and up until time T4, the amplitude of waveform D, as measured by the comparator 40, exceeds the amplitude of waveform E, wherefore the comparator 40 fails to turn the flip-flop 36 off. Thus, the flip-flop 36 and the field excitation remain "on" for the period between times T3 and T4.

At time T4, the amplitude of waveform E exceeds the amplitude of waveform D, whereupon the comparator 40 turns the flip-flop 36 off, thus also turning off Q1 and the field excitation. The field excitation remains off by operation of the comparator 40 until time T5 when a minimum "on" time pulse 45 is generated by the divider 34, thus turning the flip-flop and the field excitation on and holding it on for the duration of pulse 45 i.e., from T5 to T6. After the enforced "on" time caused by the pulse 45, the field excitation may be again turned off by operation of the comparator 40 whenever the amplitude of the waveform E exceeds the amplitude of the waveform D, and this is precisely what now erroneously occurs at time T6.

Conventionally, the filter 28 has a relatively long time constant in order to provide good regulation over the entire regulation cycle. Unfortunately, this also means that the filter 28 is unable to quickly recover from the influence of the voltage step 44 that was just induced into waveform E by virtue of the switching of the field excitation between times T4 and T5. Consequently, the output of the filter (waveform E) remains high for a relatively long period of time during which its amplitude exceeds the amplitude of the waveform D. As a result, the output of the comparator 40 turns the flip-flop and the field excitation off at time T6 and holds it off until time T8. Stated differently, the relatively long time constant associated with the filter 28 causes it to be unable to recover from the influence of the step 44 (which occurred between time T4 and T5) and thus holds its output at a relatively high level (higher than the level of the reference waveform D), thus erroneously turning the flip-flop 36 off during the period from T6 to T8, thereby also turning off the excitation to the field winding 22.

It can be seen from waveform C (the solid line portion of waveform C) that the erroneously long "off" time associated with the field excitation causes the period of the field excitation to appear twice as long as it ordinarily would be, thus effectively reducing the regulation frequency and permitting flicker to be seen in the headlights of the vehicle which incorporates this type of regulator. See also waveform B in FIG. 3 which shows how the output from the diode trio 18 declines between times T5 and T8 (the solid line portion of waveform B) before resuming an upward increase at time T8. Had the regulator not been "fooled" by the inability of the filter 28 to respond to the voltage steps 44, the field excitation would have been turned on between times T6 and T7. as indicated by the dashed line 46 in waveform C. In that case, the output of the diode tri, waveform B, would have been correct as shown by the dashed line 48.

To solve the problems caused by the inability of the filter 28 to properly recover from the effects of the voltage steps 44, the present invention senses the turn-off and turn-on of the excitation that is applied to the field winding 22 (FIG. 1), disconnects the filter 28 from the diode trio 18 responsive to the field excitation being turned off, and reconnects the filter 28 to the diode trio 18 responsive to the field excitation being turned on. With this technique, the filter 28 operates essentially as though the voltage steps 44 did not occur, thereby causing the field excitation to be turned properly off and on as shown by the dashed line 46 in waveform C (FIG. 3), and further causing the output of the diode trio 18 to be corrected as shown by dashed line 48 in waveform B.

To carry out the above described method, the embodiment shown in FIG. 1 includes switch means in the form of a switch S1 which is coupled to the diode trio 18 and to the filter 28, and means, shown as a switch driver 50, coupled to the switch S1 and coupled also to the output of the flip-flop 36 for sensing the excitation condition of the field winding 22. The switch S1 is switchable to a closed condition for coupling the output of the diode trio 18 to the filter 28, and it is also switchable to an open condition (which is shown) for decoupling the diode trio from the filter 28. The switch driver 50 switches the switch S1 to its closed condition responsive to turn-on of the field excitation, and it switches the switch S1 to its open condition responsive to turn off of the field excitation.

Because excitation of the field occurs when the output of flip-flop 36 goes high, the switch driver 50 needs merely to respond to the high level at the output of the flip-flop by switching the switch S1 to its closed condition. When the output of the flip-flop 36 goes low, the switch driver 50 switches the switch S1 to its open condition. The effects of this operation are shown in FIG. 4 to which reference is now made.

Figure 4:
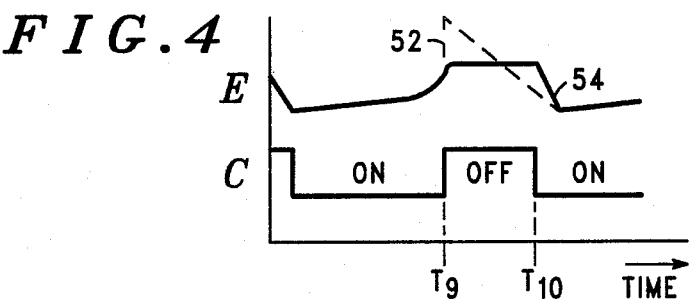

Waveform C in FIG. 4 (the field excitation voltage present at the collector of Q1) indicates that the field excitation is turned off at time T9, thereby decoupling the filter 28 from the output of the diode trio 18. This means that the output of the flip-flop 36 has gone low at that time. As a result, the switch driver 50 opens the switch S1 at time T9, thereby decoupling the filter 28 from the output of the diode trio 18. Referring to waveform E (the voltage output from the filter 28) it can be seen that the opening of the switch S1 at time T9 inhibits the filter 28 from generating the voltage step shown by the dashed line 52 because the switch S1, now being open, has decoupled the filter 28 from the voltage step that is present at the output of the diode trio 18 (see waveform B in FIG. 3).

Between times T9 and T10, the switch driver 50 holds the switch S1 in its open condition. At time T10, the output of flip-flop 36 goes high in response to an "on" pulse 45 from the divider 34 (see waveform F in FIG. 3), thereby turning the field excitation "on". This causes the switch driver 50 to close the switch S1, thereby reconnecting the input of the filter 28 to the output of the diode trio 18. Consequently, the output of the filter 28 now responds to the output of the diode trio as shown by the solid line 54 shown in waveform E.

With the switch S2 and the switch driver operating as described above, the regulator functions properly to avoid generating the erroneous voltages shown by the solid lines in waveforms B and C of FIG. 3. Correct operation has been restored without the need to alter the time constant of the filter 28.

Figure 5:
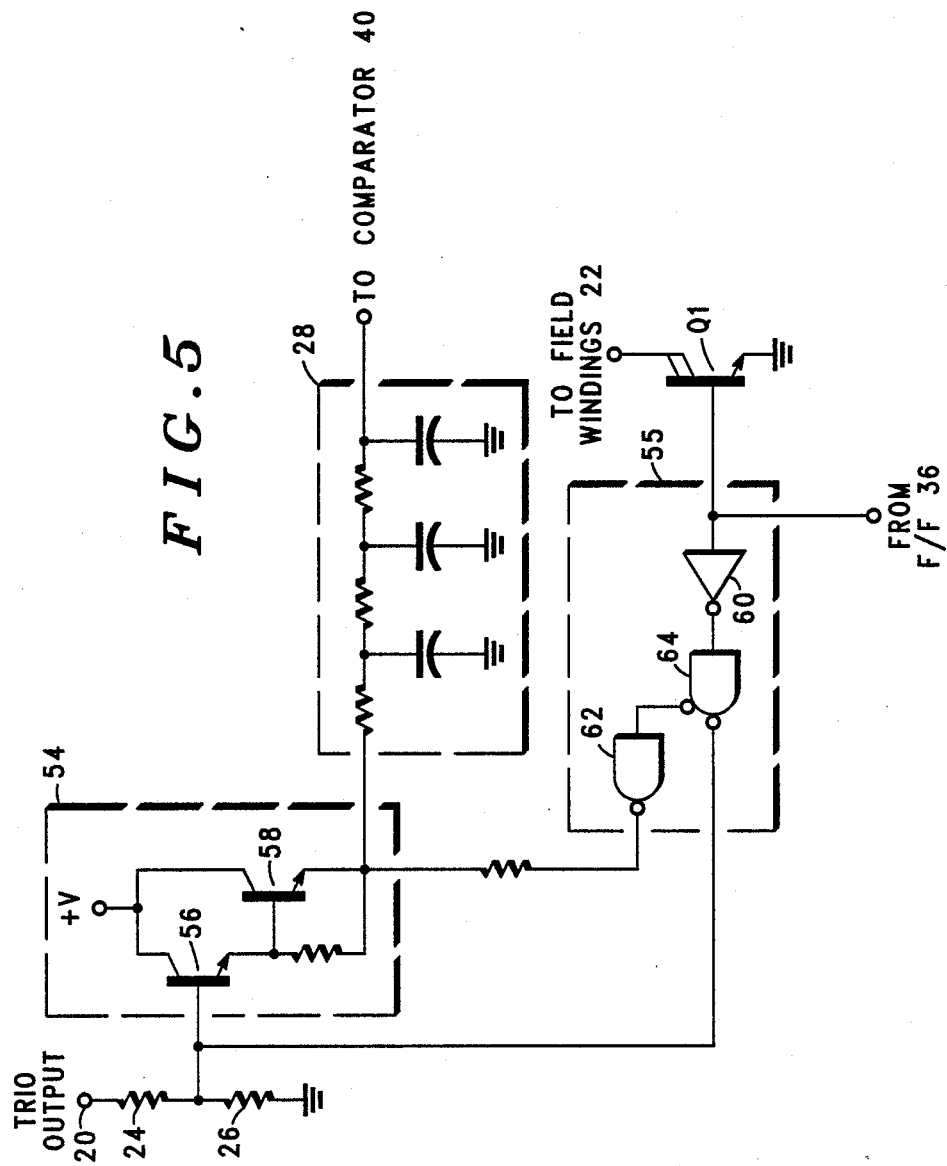
FIG. 5 is a schematic diagram that shows more detail of a switch S1 and a switch driver that are shown in FIG. 1.

Referring now to FIG. 5, illustrative circuitry is shown for implementing the switch driver 50 and the switch S1. The switch S1 may taken the form of an electronic buffer 54 comprising a pair of Darlington-connected transistors 56 and 58. As shown, this buffer is connected between the output of the diode trio (via terminal 20) and the input to the filter 28. This buffer is turned off and turned on by operation of logic circuitry 55 which acts as a switch driver and which includes an inverter 60 and a pair of interconnected NAND gates 62 and 64. The output of the NAND gate 62 is coupled to the emitter of the transistor 58 and the output of the gate 64 is coupled to the base of the transistor 56.

The operation of the logic circuitry and the electronic buffer is as follows. When the flip-flop 30 (FIG. 1) outputs a high level signal to the base of the transistor Q1, the inverter 60 and the gates 62, 64 operate to generate a high level output from the gate 64 while generating a low level output from the gate 62. These outputs operate to turn on the transistors 56, and 58, thereby connecting the output of the diode trio to the input of the filter 28.

When the output from the flip-flop 36 goes low to turn off the transistor Q1, the outputs from gates 64 and 62 go low and high respectively, thereby turning off the transistors 56 and 58 and disconnecting the filter 28 from the output of the diode trio.

It can be seen, therefore, that the circuitry shown in FIG. 5 implements the functions of the switch 51 and the switch driver 50 so as to overcome the previously discussed problems with conventional regulators.

Although the invention has been described in terms of a preferred embodiment, it will obvious to those skilled in the art that many variations and alterations may be made without departing from the invention. Accordingly, it is intended that all such alterations and variations be considered within the spirit and scope off the invention as defined by the appended claims.

What is claimed is:

1. In a vehicle charging system that includes: (a) an alternator with a field winding that is excited by a regulator, and a diode trio providing an output from the alternator, and (b) a regulator with a filter for filtering the output of the diode trio and with circuitry for turning off and turning on the excitation to the field winding, a method for rendering the regulator relatively insensitive to voltage steps induced in the output of the diode trio by the turn-on and turn-off of the field excitation, comprising:
   sensing the turn-off and turn-on of the field excitation;
   disconnecting the filter from the diode trio responsive to the field excitation being turned off; and
   connecting the filter to the diode trio responsive to the field excitation being turned on.

2. A method as set forth in claim 1 wherein the filter is disconnected from the diode trio at the beginning of turn-off of the field excitation, and wherein the filter is connected to the diode trio at the beginning of turn-on of the field excitation.

3. For use in a vehicle charging system that includes:
   (a) an alternator with a field winding that is excited by a regulator and a diode trio that provides an output from the alternator, and
   (b) a regulator with a filter for filtering the output of the diode trio and with circuitry for turning off and turning on the excitation to the field winding, the improvement comprising:
   switch means coupled to the diode trio and to the filter, the switch means being switchable to a closed condition for coupling the output of the diode trio to the filter, and being switchable to an open condition for decoupling the diode trio from the filter; and
   means sensing the excitation condition of the field winding for switching the switch means to its closed condition responsive to turn-on of the field excitation, and for switching the switch means to its open condition responsive to turn-off of the field excitation.

4. In a vehicle charging system wherein an alternator has a field winding and a diode trio, and wherein the output of the diode trio is sensed by a regulator for selectively exciting the field winding to produce a regulated alternator output, the improvement comprising:
   a filter for selectively filtering the output of the diode trio to develop a filtered signal;
   switch means connected between the diode trio and the filter, the switch means being switchable to a closed condition for coupling the output of the diode trio to the filter, and being switchable to an open condition for de-coupling the diode trio from the filter;

processing circuitry sensing the output signal from the filter for terminating the excitation of the field winding when the filter's output signal is greater than a predetermined level and for turning on the excitation of the field winding for at least a minimum "on" time; and switch diver circuitry coupled to the switch means and to the processing circuitry for switching the switch means to its closed condition in response to the beginning of the "on" time, and for switching the switch means to its open condition in response to the termination of the excitation of the field windings.

5. The improvement as set forth in claim 4 wherein the processing circuitry includes a flip-flop having a two state output for controlling the turn-on and turn-off of the field excitation, wherein the switch means includes an electronic buffer situated between the diode trio and the filter, and wherein the switch driver circuitry includes logic circuitry responsive to to the output of the flipflop for turning the buffer off and on.

* * * * *